United States Patent [19]
Gaddis et al.

[11] Patent Number: 5,505,583
[45] Date of Patent: Apr. 9, 1996

[54] SLOPE PLATES FOR PARTICULATE MATERIAL TRUCK BOX

[75] Inventors: Donald L. Gaddis, Solon; Myland D. Hepker, Urbana, both of Iowa

[73] Assignee: Courtesy Enterprises, Incorporated, Cedar Rapids, Iowa

[21] Appl. No.: 381,757

[22] Filed: Feb. 1, 1995

[51] Int. Cl.$^6$ .................................................. B60P 1/40
[52] U.S. Cl. .......................... 414/526; 414/467; 296/183
[58] Field of Search .................................. 414/467, 469, 414/519, 523, 526, 539, 507; 296/14, 183

[56] References Cited

U.S. PATENT DOCUMENTS

| | | | |
|---|---|---|---|
| 2,412,121 | 12/1946 | Bradshaw | 414/526 X |
| 3,024,932 | 3/1962 | Dodgen | 414/526 X |
| 3,179,272 | 4/1965 | Goldberger | 414/526 X |
| 3,498,486 | 3/1970 | Freeman, Jr. | 414/469 |
| 4,018,480 | 4/1977 | Stone | 296/183 X |
| 4,405,089 | 9/1983 | Taylor | 414/523 X |
| 5,085,025 | 2/1992 | Gaddis | 414/526 X |

FOREIGN PATENT DOCUMENTS

| | | | |
|---|---|---|---|
| 0057040 | 4/1984 | Japan | 414/526 |
| 1523964 | 9/1978 | United Kingdom | 296/14 |

Primary Examiner—David A. Bucci
Assistant Examiner—James W. Keenan
Attorney, Agent, or Firm—Zarley, McKee, Thomte, Voorhees, & Sease

[57] ABSTRACT

An improved slope plate assembly is provided for a truck box for use in transporting particulate material. The slope plate assembly includes a plurality of slope plate sections pivotally connected to the opposite side walls of the truck box so as to be movable between a raised inoperative position and a lowered operative position. In the lowered position, particulate material flows by gravity along the slope plate sections for discharge into an auger assembly residing below the floor of the truck box. In the raised position, bulk material or other cargo can be loaded into the truck box. A multiple-piece dividing wall can also be installed in the truck box to divide the box into multiple compartments, with the slope plates being in the lowered position in the forward compartment and in the raised position in the rearward compartment, such that particulate material may be transported in the forward compartment and bulk material transported in the rearward compartment.

14 Claims, 6 Drawing Sheets

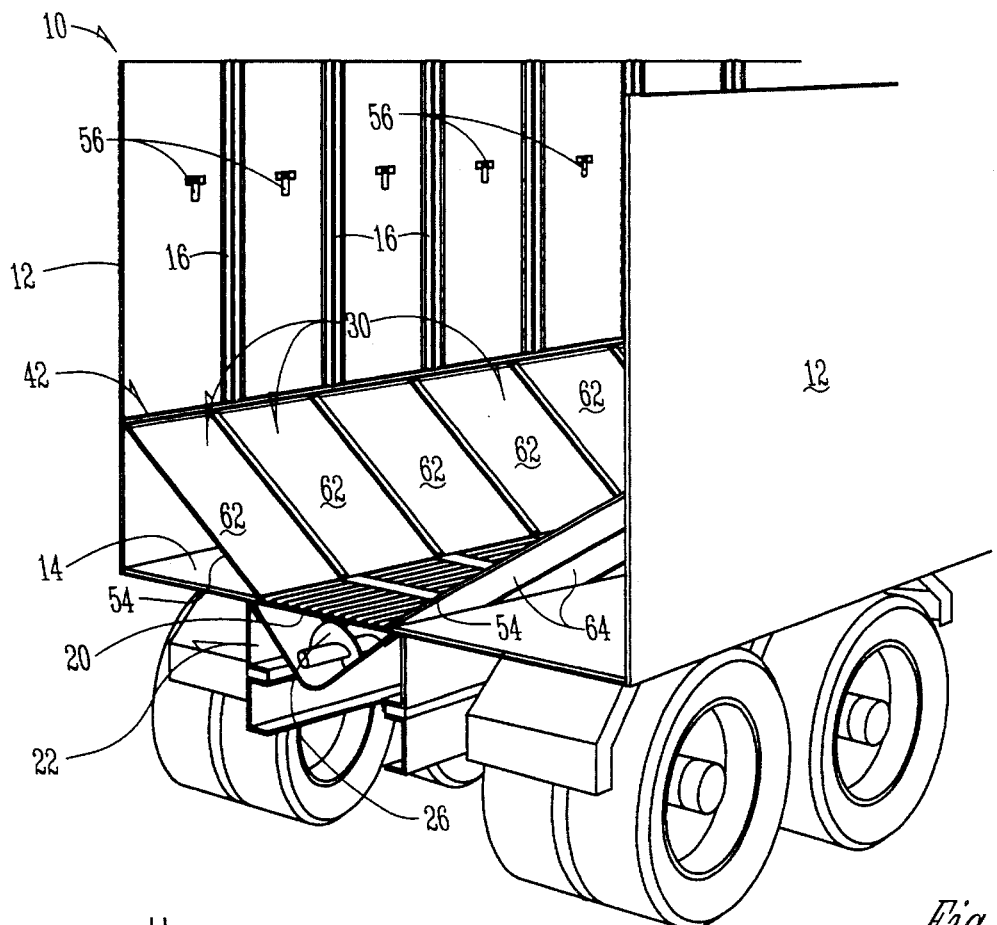
Fig.1
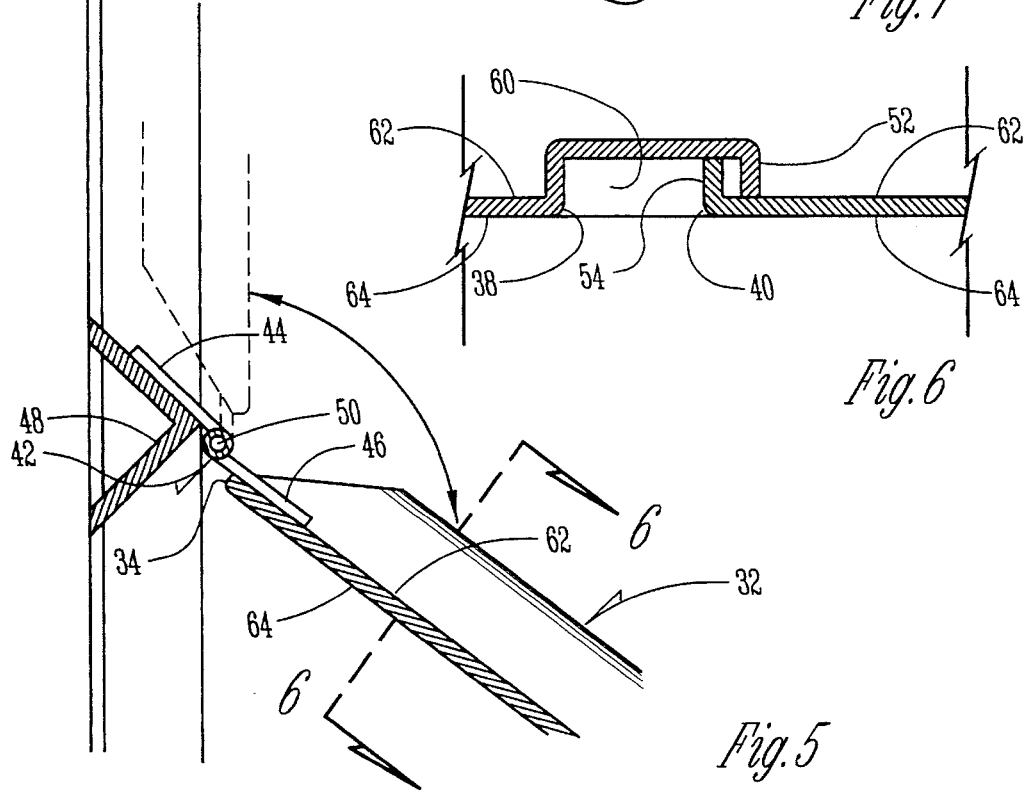
Fig.6
Fig.5

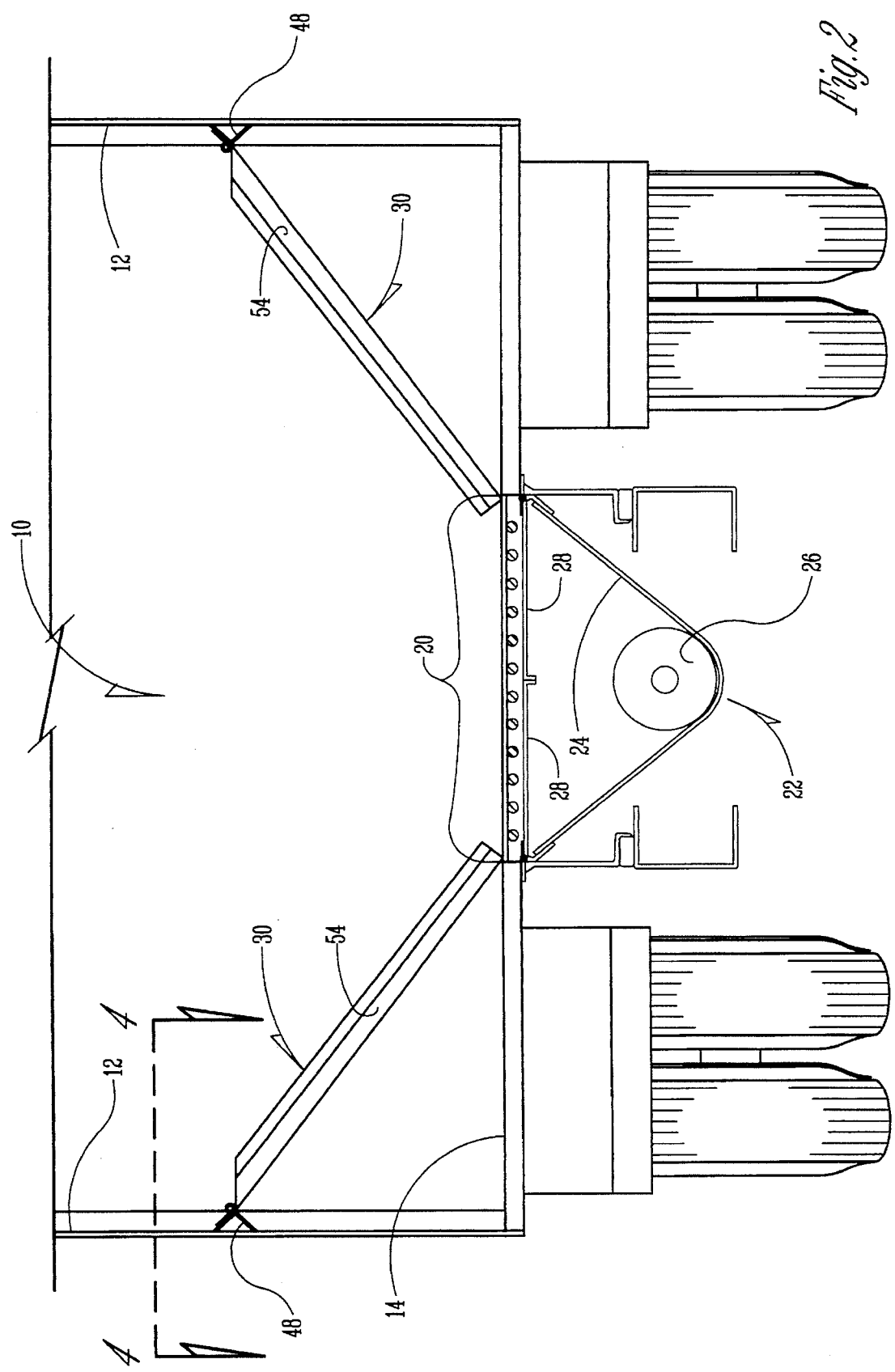

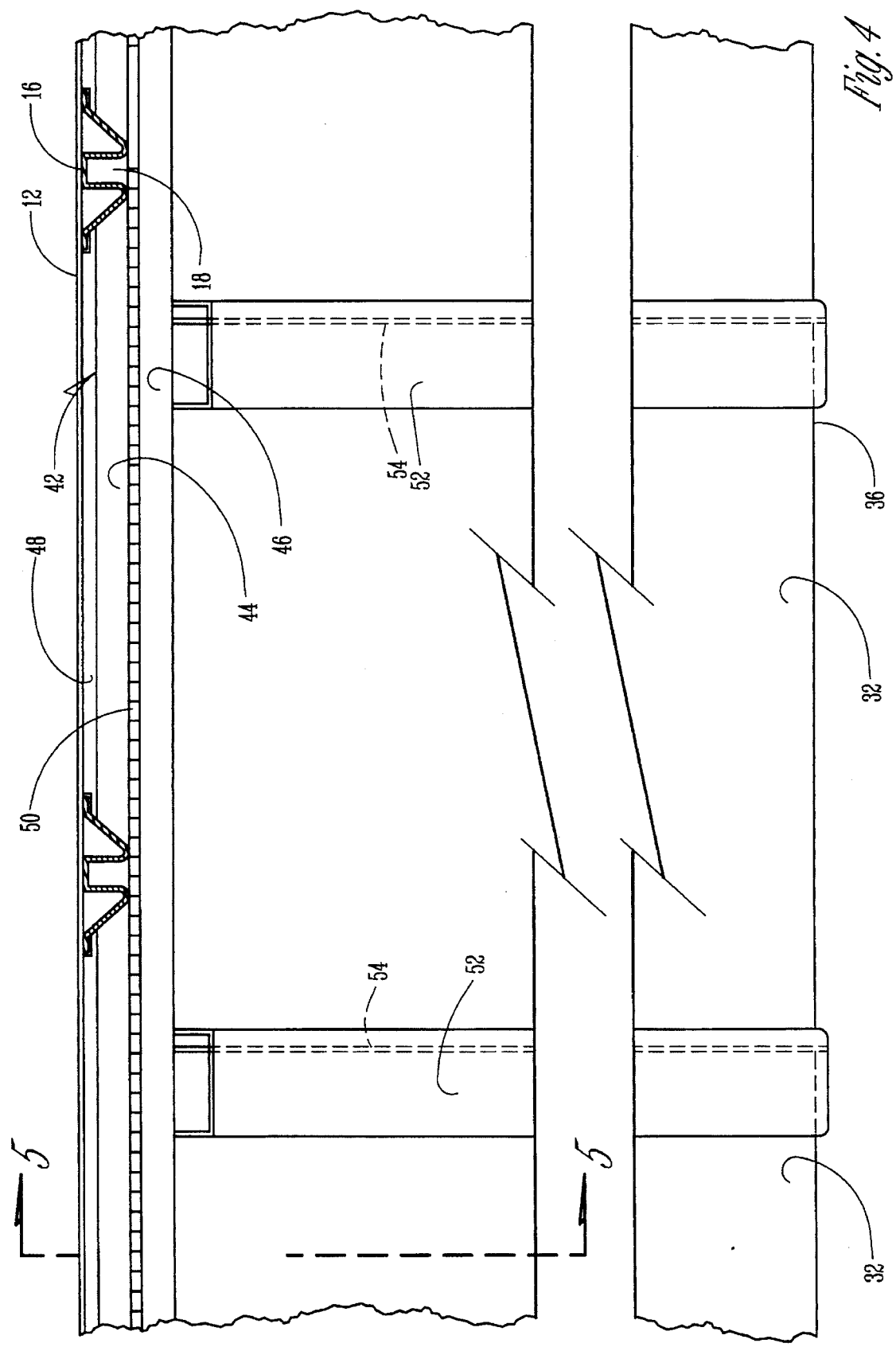

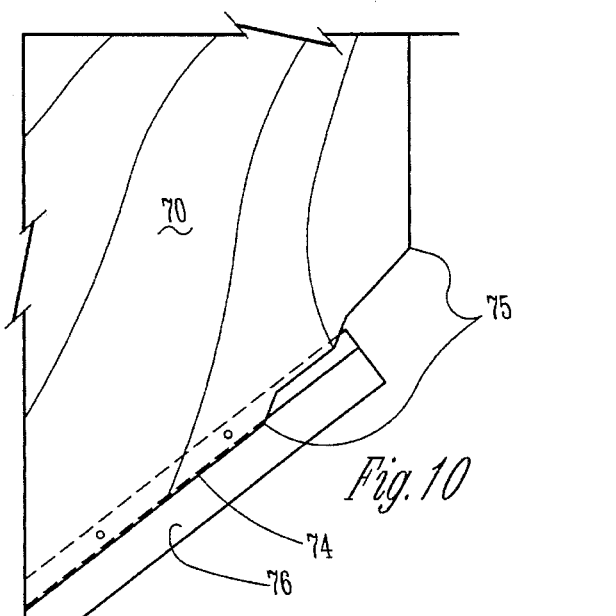
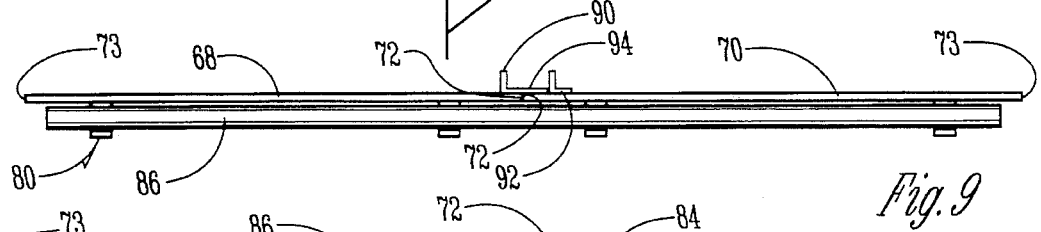
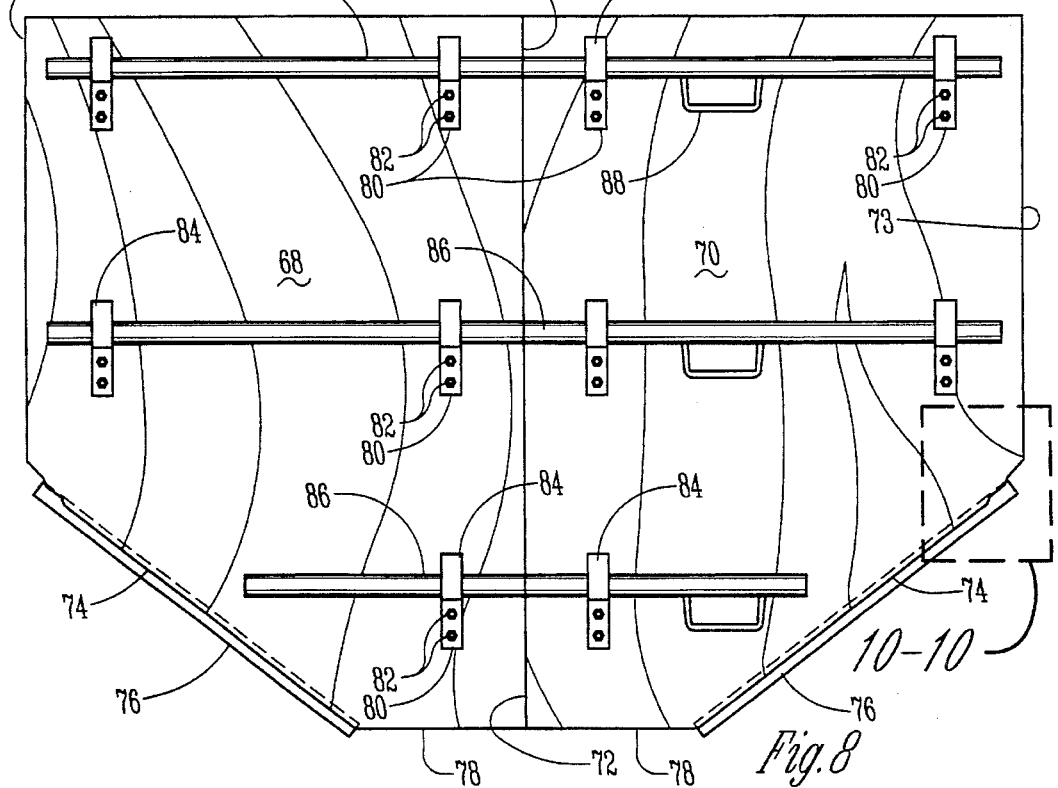

SLOPE PLATES FOR PARTICULATE MATERIAL TRUCK BOX

BACKGROUND OF THE INVENTION

Trucks are often utilized to transport particulate material, such as livestock feed and agricultural seed. Conventional truck boxes for hauling particulate material include an auger assembly positioned axially beneath the floor of the box, with an opening in the floor providing access to the auger assembly. However, the flat floor of the truck box does not allow all of the particulate material to flow by gravity into the auger assembly, thus requiring manual shoveling or sweeping of the material adjacent the side walls of the truck box into the auger assembly. Such manual labor increases the time and cost to unload the truck. The manual shoveling and sweeping also subjects the laborer to potential back injuries from stress or strain.

Some truck boxes have overcome the problems associated with the square corner truck box by providing a sloped floor or sloped plates extending between the side wall and the floor, thus eliminating the need to shovel or sweep material from the corners. Such slope plates conventionally are manually carried or slid into position in the truck. Thus, substantial labor is still involved, thereby increasing time and cost factors, and subjecting the worker to back stress and strain. Also, with prior art slope plates, particulate material escapes through openings between the plates, and through openings between the plates and the side walls or floor of the truck box, into the corners of the box, thus again requiring shoveling or sweeping.

Therefore, a primary feature of the present invention is the provision of improved slope plates for use in a particulate material truck box.

Another feature of the present invention is the provision of pivotal slope plates which can be moved between a raised inoperative position adjacent the side walls of the truck box and a lowered operative position extending between the side wall of the box and the auger trough opening in the floor of the box.

Another feature of the present invention is the provision of pivotal slope plates for a truck box which overlap one another to prevent seepage of particulate material into the corners of the box.

A further feature of the present invention is the provision of an improved slope plate assembly for a truck box wherein a series of plate sections are hinged to the side wall of the box for selective and sequential movement between raised and lowered positions.

Another feature of the present invention is the provision of a series of slope plate sections for a truck box which are offset with respect to the stakes in the side wall of the truck box, thereby allowing a dividing wall to be selectively positioned between opposing stakes with minimal lost space.

Another feature of the present invention is the provision of slope plates having smooth upper and lower surfaces to prevent unobstructed loading and unloading for both particulate material and other cargo.

A further feature of the present invention is the provision of a truck box having slope plates and a selectively positioned dividing wall which sealingly engages the slope plates to prevent flow of particulate material beneath the slope plate.

Still another feature of the present invention is the provision of improved truck slope plates which are economical to manufacture and install, and are durable and safe in use.

These and other features will become apparent from the following description of the invention.

SUMMARY OF THE INVENTION

The slope plate assembly of the present invention includes a plurality of slope plate sections which are individually pivotally connected to the opposite side walls of the truck. The slope plate sections are movable between a raised inoperative position adjacent the side walls of the truck, and a lowered operative position extending between the respective side wall and floor of the truck. In the lowered position, the slope plates allow particulate material to flow by gravity into an auger assembly axially positioned beneath the floor of the truck box. When the slope plate sections are in the raised position, other cargo, such as bulk feed bags, can be loaded into the truck box. The slope plate sections have opposite edges which overlap adjacent plates. The upper and lower surfaces of the slope plate assembly is substantially smooth so as to enhance loading and unloading of particulate material and other cargo, without damage thereto.

A dividing wall can be installed in the truck box so as to divide the box into multiple compartments. The dividing wall extends between the side wall stakes of the box, and sealingly engages the lowered slope plate sections. The dividing wall is constructed in two halves, which simplify installation and minimizes risk of back stress and strain to the worker. A plurality of cross bars provide structural rigidity to the assembled dividing wall.

DESCRIPTION OF THE DRAWINGS

FIG. 1 is a perspective view from the rear of the truck, showing the slope plates in a lowered position.

FIG. 2 is an end view showing the slope plates in the lowered position.

FIG. 4 is a sectional view taken along lines 4—4 of FIG. 2 showing the offset position of the slope plates relative to the side wall stakes.

FIG. 5 is an enlarged view taken along lines 5—5 of FIG. 4 showing the slope plate hinge, with the lowered position of the slope plate sections shown in solid lines and the raised position shown in broken lines.

FIG. 6 is a sectional view taken along lines 6—6 of FIG. 5 showing the overlapping edges of adjacent slope plates and the smoother outer surface of the plates.

FIG. 8 is an end view showing the rearward side of the dividing wall.

FIG. 9 is a top view of the dividing wall.

FIG. 10 is an enlarged view showing the slope bottom edge of the dividing wall.

DETAILED DESCRIPTION OF THE DRAWINGS

Figure 3:
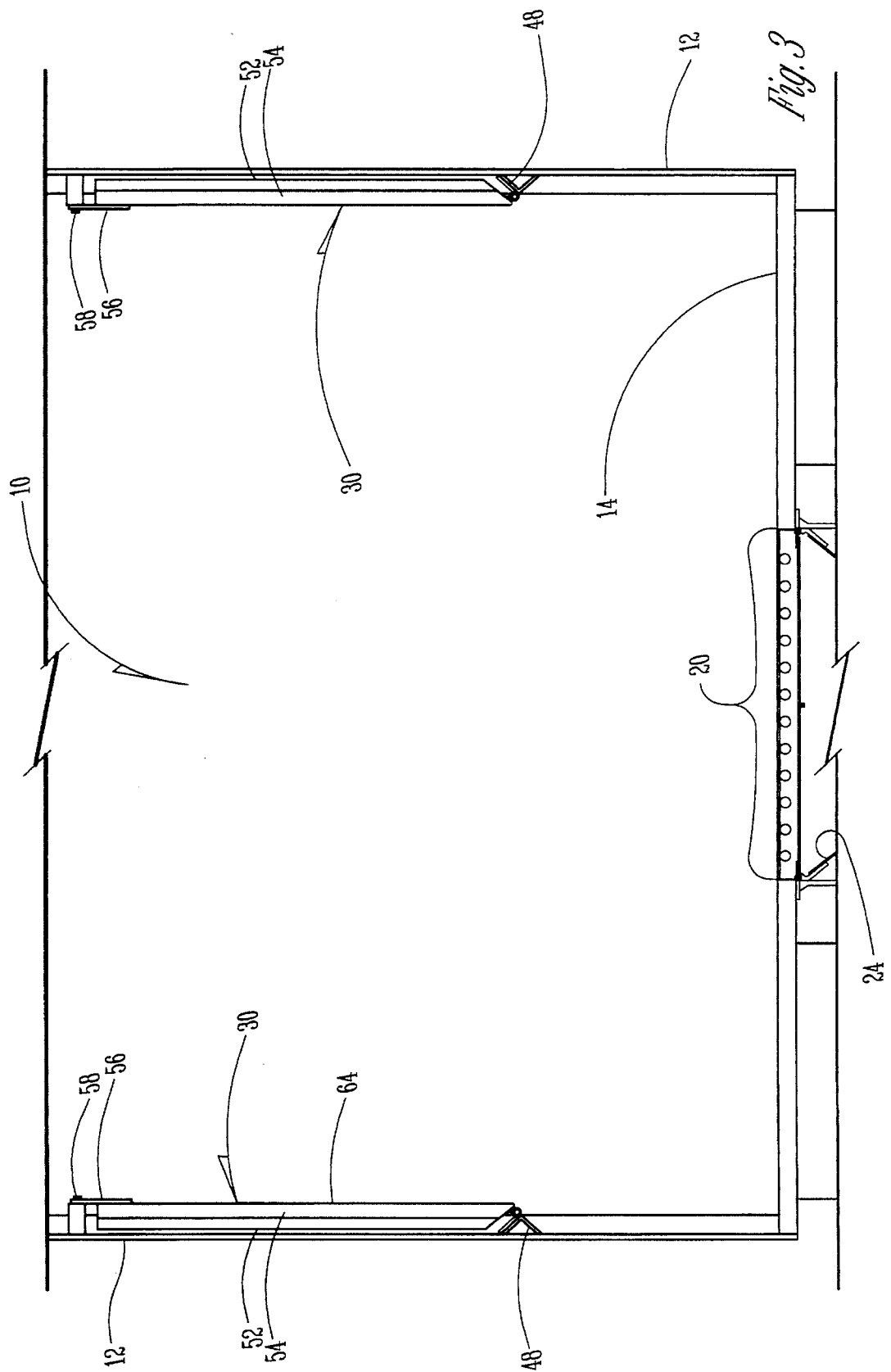
FIG. 3 is an end view showing the slope plates in a raised position.
Figure 7:
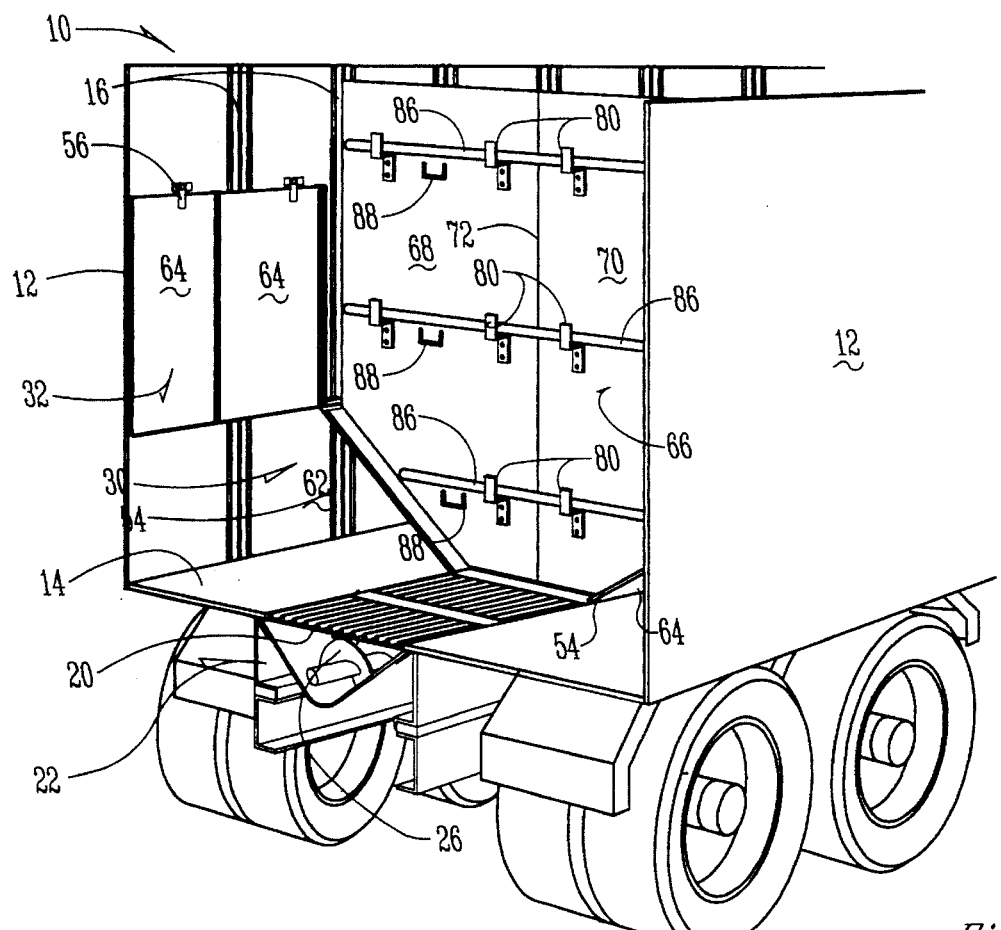
FIG. 7 is a perspective view showing a dividing wall installed within the truck box.

With reference to the drawings, a truck box is generally designated by the reference numeral 10. The box includes opposite side walls 12 and a floor 14. The side walls 12 include upright structural stakes 16 which include an inwardly facing channel 18. The floor 14 has an opening 20 which extends axially along the length of the box 10. An auger assembly 22 is mounted to the truck floor 14 beneath the opening 20. The auger assembly 22 includes an auger trough 24 and rotatable auger flighting 26 extending along the length of the trough. A pair of doors 28 move between open and closed positions to control access from the truck box 10 to the auger assembly 22. The movement of the doors between the open and closed positions is controlled by any conventional means.

The above description of the truck box 10 is conventional and does not constitute a part of the present invention.

The present invention is directed towards a slope plate assembly 30, which allows particulate material to flow by gravity into the auger assembly 22 when the doors 28 are opened. More particularly, there is a slope assembly 30 pivotally mounted to each side wall 12 of the truck box 10. Each slope plate assembly 30 is comprised of a plurality of slope plate sections 32. Each slope plate section 32 includes a top edge 34, a bottom edge 36, a front edge 38, and a rear edge 40.

The top edge 34 of each plate section is pivotally connected to the side wall 12 by a hinge 42. Preferably, a continuous piano hinge is used to pivotally mount all of the slope plate sections 32 on each side of the truck box 10. A continuous hinge is preferred over separate hinges, so as to eliminate the need for additional sealing elements to prevent escape of particulate material between the top edge 34 of the slope plate sections 32 and the respective side wall 12 of the truck box 10.

As best seen in FIG. 4, the hinge 42 includes an upper leaf 44 and a lower leaf 46. A plurality of hinge support members 48 are welded to the side wall 12 between the stakes 16. The upper leaf 44 of the hinge 42 is welded to the support members 48, while the lower leaf 46 is welded to the slope plate sections 32 adjacent the top edge 34 thereof. The upper and lower leaves 44 and 46 are reversed with respect to one another, such that the leaves extend from opposite sides of the hinge axis 50, as seen in FIG. 4.

The hinge 42 allows the slope plate sections to be pivotally moved between a raised inoperative position, wherein the sections are adjacent the respective side walls 12 of the truck box, as shown in FIG. 3, and a lowered operative position extending between the respective side walls and the floor 14, as shown in FIG. 2. In the lowered position, the bottom edge 36 of each section 32 is adjacent the opening 20 in the floor 14, such that particulate material can flow by gravity into the auger trough 24 when the auger doors 28 are open.

As seen in FIG. 6, the front edge 38 of each slope plate section 32 has a downwardly or inwardly directed channel 52 extending along the length thereof. The opposite side edge 40 has an upwardly or outwardly directed lip 54. As seen in FIG. 4, the channel 52 and the lip 54 are beveled adjacent the top edge 34 of each plate section 32, such that the section will fold to the raised position without interference or engagement with the hinge support member 48.

As best seen in FIG. 6, the adjacent edges 38, 40 of adjacent sections 32 overlap one another. More particularly, the lip 54 on the forward one of adjacent sections 32 is received within the channel 52 on the rear one of adjacent sections. The channel 52 is substantially wider than the lip 54 to provide adequate tolerance. Thus, the slope plate sections 32 can be individually lowered from the raised position to the lowered position, beginning with the section adjacent the forward end of the truck box 10. Conversely, when moving the slope plate sections from the lowered position to the raised position, the plate sections are raised sequentially beginning with the rearward-most lowered plate section. One or more plate sections can be lowered on each side of the truck box, as desired. The hinge leaves 44, 46 are notched to accommodate the stakes 16 and the channels 52, respective, while the hinge axis extends continuously between the hinge support member 48 and the slope plate sections 32.

A retainer clip 56 maintains each slope plate section 32 in the raised position. Each retainer clip 56 is mounted by a bolt 58 on the respective side wall 12 above the slope plate section 32, as best seen in FIG. 3. The clip 56 is pivotal between a first position overlapping the bottom edge 36 of the respective slope plate section 32, thereby maintaining the section in the raised position, and a second position disengaged from the slope plate section, such that the section can be pivoted to the lowered operative position.

The channel 52 on each slope plate section includes a cap 60 adjacent the bottom edge 36 of the section. The cap 60 prevents particulate material from migrating behind the slope plate sections into the corners of the truck box.

The slope plate sections include opposite upper and lower surfaces 62, 64 respectively. Since the channel 52 and lip 54 extend upwardly or outwardly from the surface 64, when the sections are in the raised position, the lower surfaces are substantially co-planar and free from protrusions, thereby presenting a substantially smooth surface for the slope plate assembly 30. The smooth or flush surface allows bulk material to be easily loaded in the truck box 10 without damage to the material or its container. The bulk material will easily slide along the smooth lower surface 64 which is presented inwardly when the sections are in the raised position. When the sections are in the lowered position, the channel 52 and the lip 54 of an adjacent section extend upwardly above the upper surface 62. However, this upward projection of the channel 52 does not obstruct the flow of particulate material downwardly along the upward surface 62.

As best seen in FIG. 4, the slope plate sections 32 are staggered or offset with respect to the side wall stakes 16. A bulk dividing wall 66 can be inserted between opposite stakes 16 to divide the truck box into forward and rearward compartments, if desired. Since the slope plate sections can be lowered sequentially from the front of the truck box, the front compartment is adapted to contain particulate material. The slope plate sections in the rear compartment are maintained in the raised position, such that bulk material or other cargo can be loaded into the rear compartment. The staggered position of the slope plate sections 32 relative to the side wall stakes 16 minimizes the amount of wasted or lost space in the rear compartment. More particularly, only a few inches of space is lost where the rear edge 40 of the last lowered slope plate section 32 extends rearwardly beyond the dividing wall 66. The dividing wall 66 may be used in any of the opposing stakes 16 along the length of the truck box 10.

Preferably, the dividing wall 66 is comprised of two halves or sections 68, 70, as seen in FIGS. 8 and 9. Each section 68, 70 includes an inner edge 72, with the inner edges abutting one another when the sections are assembled. Each wall section 68, 70 has a side edge 73 adapted to be received within the channel 18 of a stake 16 in the side wall 12 of the truck box. Each wall section 68, 70 also includes a sloped lower edge 74 adapted to engage a respective slope plate section 32. The sloped edge 74 includes a notch 75 adjacent the side edge 73. The notch has a two step shape corresponding to the hinge leaves 44, 46 and allows the wall sections 68, 70 to fit relatively tightly over the hinge 42, thereby preventing escape of particulate material between the dividing wall and the truck sidewall or slope plate sections. Preferably, the sloped edge 74 has a flexible seal member 76 attached thereto to provide sealing engagement between the edge 74 and the slope plate section 32. The sealing member 76 may be constructed from a conventional door weather stripping or sweep member. An acceptable sealing member is a commercially available product known as "Alumi-Door Sweeps" from McMaster-Carr. Each section 68 also includes a bottom edge 78 adapted to engage the floor 12 of the truck box.

The wall section 68, 70 each have a plurality of brackets 80 attached thereto with bolts 82 or other securement means. The brackets include a leg 84 spaced apart from the wall section 68, 70 so as to receive a support brace 86. The brace 86 may be constructed from a pipe or bar stock material having an exterior dimension slightly less than the space between the leg 84 and the wall section 68, 70. The brace 86 includes a handle 88 to facilitate installation of the brace 86 in the brackets 80. The brackets 80 and support brace 86 are located on the rearward surface of the wall sections 68, 70 so that the dividing wall 66 can be installed in the truck box with the worker exiting through the rear door of the box.

A pair of L-shaped stop members 90, 92 are mounted on the forward side of the wall sections 68, 70, respectively, adjacent the inner edge 72 thereof. The stop member 90 includes a leg 94 which extends beyond the inner edge 72 of the wall section 68, as best seen in FIG. 9. The terminal end of the leg 94 is adapted to abut the stop member 92 on the wall section 70, such that the inner edges 72 of the sections 68, 70 engage one another. The stop members 90, 92 facilitate the alignment of the wall sections 68, 70 when the dividing wall 66 is being installed in the truck box. The stop members 90, 92 are secured to the wall sections 68, 70, respectively, with bolts, or other conventional fasteners.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. An improved truck box for transporting particular material, comprising:

a substantially horizontal floor having opposite forward and rearward ends, opposite sides, and an elongated opening extending longitudinally along the length of the floor;

opposite first and second side walls extending substantially vertically upwardly from each side of the floor;

a first slope plate assembly pivotally connected to the first side wall for pivotal movement between a substantially vertical raised position adjacent the first side wall and a lowered position extending angularly between the first side wall and the floor;

a second slope plate assembly pivotally connected to the second side wall for pivotal movement between a substantially vertical raised position adjacent the second side wall and a lowered position extending angularly between the second side wall and the floor;

each slope plate assembly including a plurality of slope plate sections which are individually pivotal between the raised and lowered positions;

the side walls including a plurality of vertically disposed stakes;

the slope plate sections being offset with respect to the stakes, and the slope plate sections having opposite side edges with one edge having a tongue and the opposite edge having a groove, with adjacent edges of adjacent slope plate sections overlapping one another, with the tongue of one plate being received in the groove of the adjacent plate, the tongue and groove each having a width with the width being substantially greater than the tongue width to provide tolerance between the tongue and groove of adjacent overlapped plates.

2. The truck box of claim 1 wherein the sections successively overlap one another from the forward end of the floor to the rearward end of the floor, whereby one or more of the slope plate sections are selectively movable from the raised position to the lowered position, beginning with the forward-most section.

3. The truck box of claim 1 wherein the slope plate sections have substantially smooth lower surfaces.

4. The truck box of claim 3 wherein the lower surfaces are free from protrusions.

5. The truck box of claim 1 further comprising a retainer on each side wall for retaining the respective slope plate in the raised position.

6. The truck box of claim 5 further comprising a dividing wall that includes multiple portions which can be assembled to provide structural rigidity to the dividing wall.

7. The truck box of claim 1 wherein each slope plate has a lower edge in close proximity to the opening in the floor when the plate is in the lowered position.

8. The truck box of claim 1 further comprising a dividing wall insertable between the side walls to define forward and rearward compartments in the truck box, with the slope plates being in the lowered position in one compartment and being in the raised position in the other compartment.

9. The truck box of claim 1 further comprising an auger trough below the opening in the floor, and an auger operatively mounted within the trough.

10. A slope plate assembly for use in a truck box having a substantially horizontal floor, opposite side walls extending substantially vertically upwardly from the floor, a plurality of vertically disposed stakes spaced along the side walls, and an auger system residing below the floor for discharging particulate material from the box, the assembly comprising:

a plurality of slope plate sections pivotally mountable on each side wall for pivotal movement between a substantially vertical raised position adjacent the one side wall and a lowered position extending angularly between the one side wall and the auger system;

the slope plate sections having substantially smooth lower surfaces and opposite side edges, one of the side edges having a C-shaped channel and the other side edge having a lip, and the adjacent edges of adjacent slope plate sections overlapping one another with the lip of one plate being received in the C-shaped channel of an adjacent plate; and retainers mountable on the side walls to selectively retain the slope plates in the raised positions.

11. The slope plate assembly of claim 10 wherein the sections successively overlap one another from a forward end of the floor to a rearward end of the floor, whereby one or more of the slope plate sections are selectively movable from the raised position to the lowered position, beginning with the forward-most section.

12. The slope plate assembly of claim 10 wherein the lower surfaces of the slope plate sections are free from protrusions.

13. The slope plate assembly of claim 10 wherein the slope plate sections are offset with respect to the stakes.

14. The improved truck box according to claim 1 wherein the groove has opposite legs and a web between the legs so as to define the groove width.

* * * * *